United States Patent
Wang

(10) Patent No.: US 7,055,083 B2
(45) Date of Patent: May 30, 2006

(54) METHOD AND APPARATUS FOR ALLOCATING CRC CODES IN A FLASH ROM

(75) Inventor: Hong-Rong Wang, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 471 days.

(21) Appl. No.: 10/334,496

(22) Filed: Dec. 31, 2002

(65) Prior Publication Data

US 2004/0049727 A1    Mar. 11, 2004

(30) Foreign Application Priority Data

Sep. 9, 2002   (TW) .............................. 91120392 A

(51) Int. Cl.
*H03M 13/00*   (2006.01)
(52) U.S. Cl. ...................................... 714/773; 714/758
(58) Field of Classification Search ................ 714/773, 714/758

See application file for complete search history.

(56) References Cited

U.S. PATENT DOCUMENTS 5,459,850 A * 10/1995 Clay et al. ................... 711/171
5,951,707 A *  9/1999 Christensen et al. ........ 714/752

* cited by examiner

*Primary Examiner*—Joseph Torres
(74) *Attorney, Agent, or Firm*—Wei Te Chung

(57) ABSTRACT

A method and apparatus for allocating CRC (Cyclic Redundancy Check) codes in a flash ROM (Read-Only Memory). The apparatus includes a flash ROM and a microprocessor. The flash ROM is logically divided into a plurality of data blocks. Each data block contains a CRC code block that includes a plurality of bytes for saving CRC codes. The microprocessor can write to and read from the flash ROM, calculate a complement code of a sum of all the bytes of the data block, and add the complement code to data of one of the plurality of bytes. The microprocessor thus generates new CRC codes and writes them to the corresponding CRC code block. The new CRC codes generated can meet the critical requirement of CRC. That is, the sum of all the bytes of the data block (including the CRC code block) is null.

4 Claims, 3 Drawing Sheets

METHOD AND APPARATUS FOR ALLOCATING CRC CODES IN A FLASH ROM

BACKGROUND OF THE INVENTION

1. Field of the Invention

This invention relates to a method and apparatus for allocating CRC (Cyclic Redundancy Check) codes in a flash ROM (Read-Only Memory), and more specifically a method and apparatus that can effectively reduce the times of erasing CRC codes.

2. Description of Related Art

It is very important for organizations and private users alike that electronic data be written to and read from a storage system quickly and reliably. A storage system may be logically divided into a plurality of data blocks, with each data block being further divided into a plurality of bytes. One method widely used to ensure reliable reading and writing of data is to perform a CRC (Cyclic Redundancy Check) on the data. When the data is written to the storage system, CRC codes are generated and saved in one or more bytes that are predefined in position. And when the data is read from the storage system, its CRC codes are read as well and compared to the newly calculated CRC codes associated with data read. If the newly calculated CRC codes match the stored CRC codes, the data is likely to be correct. Should the newly calculated CRC codes not match the stored CRC codes, there is something wrong with data read.

A conventional storage system may use semiconductors, magnetic devices or optical devices as its storage medium. A typical storage system generally comprises erasable read only memory, such as flash ROM and EEPROM (Electrically Erasable Programmable Read Only Memory). Flash ROM and EEPROM can both retain data while power is off, and can update the data according to new input data. There are some differences between flash ROM and EEPROM. EEPROM needs a voltage higher than normal to erase the data, so an additional device is always needed to accomplish erasing of data. Flash ROM can work under a normal voltage while erasing the data. In addition, only one byte at a time can be erased in an EEPROM, while a plurality of bytes at a time can be erased in a flash ROM. However, flash ROM has problems such as a limited number of erasures, limited erasing speed and bad tracks. A flash ROM has a lifetime of about 100,000 erasures.

The drawback of saving CRC codes in a flash ROM or an EEPROM is that the CRC code has to be erased and rewritten every time any data is updated, even when only one byte is updated. Conventional methods typically handle this problem in one of two ways. The first way is to increase the physical capability of the flash ROM or EEPROM, such as improving erasure lifetime and erasing speed. The second way is to maintain a plurality of CRC codes for related data. In this way, the occasions of erasing one CRC code are distributed to a plurality of CRC codes.

With the increasing popularity of network and portable devices, the demand for storage capacity has been increasing commensurately. For example, downloading of data such as software and music requires updating of data stored in a storage system. These days, erasing of CRC codes is more frequent than ever.

In a flash ROM, a bit can be rewritten from the value 1 to the value 0, and can be erased from the value 0 to the value 1. Rewriting means changing a bit from a high level voltage that represents 1 to a low level voltage that represents 0. Erasing refers to changing a bit to a high level voltage that can be rewritten. One byte comprises 8 bits, and may for example have a binary numerical value 11110101. This byte can be rewritten as 101000101, since any corresponding bit having a value 1 can be rewritten to the value 0. Said byte cannot for example be rewritten as 10011101, since the fifth bit of the byte has a value 0 that cannot be rewritten as the value 1. So it is necessary to erase the byte to 11111111, and then rewrite it to 10011101. Conventional methods have not adequately taken advantage of this characteristic of flash ROMs. Thus, there exists a need for a method and apparatus that can reduce the number of erasures of CRC codes in a flash ROM.

SUMMARY OF THE INVENTION

It is an object of the present invention to provide a method for allocating CRC codes in a flash ROM which can reduce the number of erasures of CRC codes.

It is another object of the present invention to provide an apparatus for allocating CRC codes in a flash ROM which can reduce the number of erasures of CRC codes.

According to one aspect of the present invention, a method for allocating CRC codes in a flash ROM is provided. A microprocessor is used to control the generation of CRC codes and data reading and writing. The method including the steps of: (a) logically dividing a flash ROM into a plurality of data blocks, each of the plurality of data blocks including a CRC code block, the CRC code block including a plurality of bytes for saving CRC codes; (b) reading data from a data block of the flash ROM arid calculating a complementary code of a sum of all the bytes of the data block; (c) adding a value of each of the plurality of bytes of the CRC code block of the data black to the complementary code and obtaining a first sum, and performing an AND-operation on a bit by bit basis between the first sum and the value of the byte; (d) writing the first sum to the bytes a new CRC code if any one of the results of the AND-operation is equal to the first sum; or (e) randomly selecting a byte in the CRC code block if none of the results of the AND-operation for the plurality of bytes of the CRC code block is equal to the first sum, adding the value of the byte with the complementary code and obtaining a second sum, erasing the byte, and writing the second sum to the byte as a new CRC code. The new CRC code generated by following the above-described method can meet the critical requirement of CRC. That is, the sum of all the bytes of the data block (including the CRC code block) is null.

In accordance with another aspect of the present invention, an apparatus for allocating CRC codes in a flash ROM includes: a flash ROM logically divided into a plurality of data blocks, each of the plurality of data blocks including a CRC code block, the CRC code block including a plurality of bytes for saving CRC codes; and a microprocessor used for writing to and reading from the flash ROM, reading data from a data block of the flash ROM and calculating a complementary code of a sum of all the bytes of the data block, adding a value of one of the plurality of bytes of the CRC code block of the data block to the complementary code to obtain a first sum, and performing an AND-operation on a bit by bit basis between the first sum and the value of the byte. The microprocessor writes the first sum to the byte as a new CRC code, if the result of the AND-operation is equal to the first sum. The microprocessor randomly selects a byte in the CRC code block, if none of the results of the AND-operation for the plurality of bytes of the CRC code block is equal to the first sum; then the microprocessor adds the value of the byte with the complementary code and obtains a second sum, erases the byte, and writes the second sum to the byte as a new CRC code. The microprocessor thus generates new CRC codes, and writes them to the corresponding CRC code block. The new CRC codes generated by the above-described apparatus can meet the critical requirement of CRC. That is, the sum of all the bytes of the data block (including the CRC code block) is null.

Other objects, advantages and novel features of the present invention will be drawn from the following detailed description of the present invention with the attached drawings, in which:

DETAILED DESCRIPTION OF THE INVENTION

Figure 1:
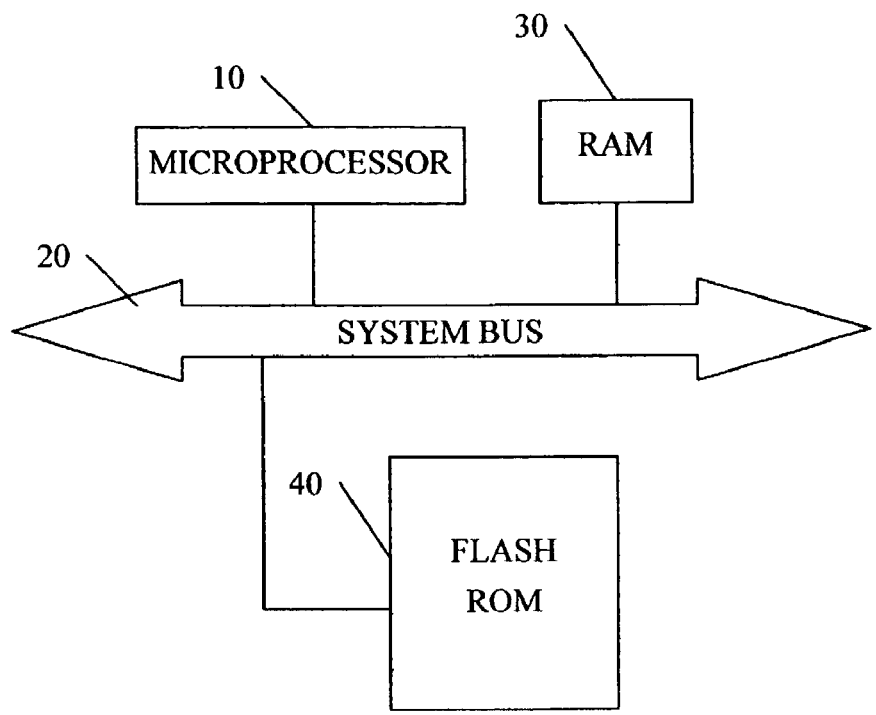
FIG. 1 is a block diagram of hardware of an apparatus for allocating CRC codes in a flash ROM according to the present invention, said apparatus comprising a flash ROM.

FIG. 1 is a block diagram of hardware of an apparatus for allocating CRC codes in a flash ROM according to the present invention. The apparatus includes a microprocessor 10, a system bus 20, a RAM (Random-Access Memory) 30 and a flash ROM 40. The microprocessor 10 controls the operation of data output and input, and has the function of adding and performing AND-operation bit by bit. The system bus 20 can be any kind of appropriate data/control bus over which the signals are transmitted. The microprocessor 10 sends controlling signals over the system bus 20 to the RAM 30 and the flash ROM 40, and transports data between the RAM 30 and the flash ROM 40. The RAM 30 is an internal memory capable of supplying operating programs and a space for the microprocessor 10 to save data temporarily. The flash ROM 40 is an external memory. Data saved in the flash ROM 40 can be updated frequently. Such data may be system information, programs, personal data, and so on. The microprocessor 10 can read data from the flash ROM 40, and transmit the data to the RAM 30. The microprocessor 10 can also receive data from external data sources (not shown) through the system bus 20, and save the data to the flash ROM 40.

Figure 2:
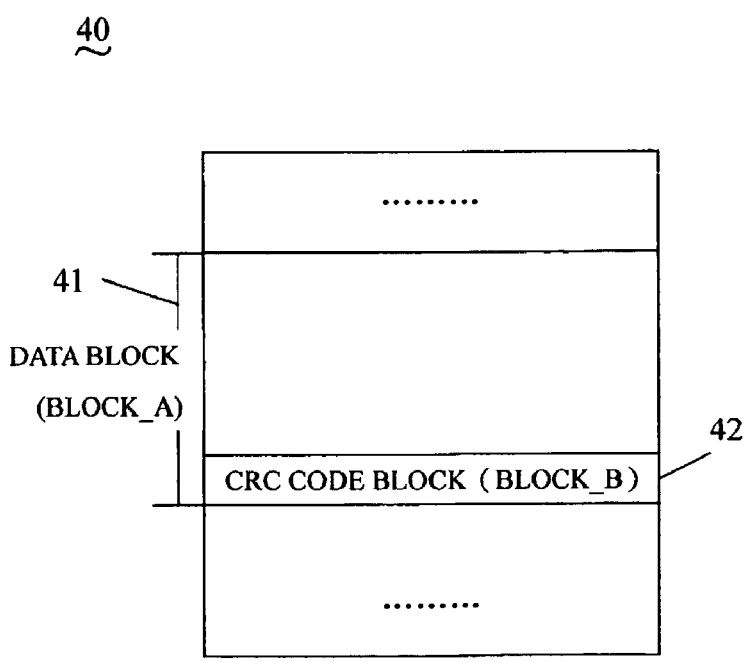
FIG. 2 schematically illustrates storage space of the flash ROM of FIG. 1 where the CRC codes are saved, according to the present invention.

FIG. 2 schematically illustrates storage space of the flash ROM 40 where the CRC codes are saved, according to the present invention. The storage space comprises a storage system logically divided into a plurality of data blocks 41, with each data block 41 being further divided into a plurality of bytes. That is, the flash ROM 40 is divided into a plurality of data blocks 41, with each data block 41 containing a CRC code block 42. The CRC code block 42 contains a plurality of bytes to save the CRC codes, and each CRC code occupies one byte.

While reading data, the microprocessor 10 reads from the data blocks 41 of the flash ROM 40, and temporarily saves the data in the RAM 30. The data that is read contains data of the CRC code block 42. Before outputting the data, the microprocessor 10 performs a cyclic redundancy check on the data that has been read. All bytes are added up to a sum. If the sum is 0, this represents that the data has been read correctly. If the sum is not 0, this represents that there is something wrong with the data that has been read. Conventional methods as known in the art can be used to modify the data, or to return a message indicating that something is wrong and reread the data.

When the microprocessor 10 writes data to the assigned data block 41, the CRC codes must be rebuilt. By following the method of the present invention, appropriate bytes of the corresponding CRC code block 42 can be found and rewritten as new CRC codes, or can be erased and then written as new CRC codes. In the following description, "erasing" means changing a byte to a status such that the byte is rewritable.

Figure 3:
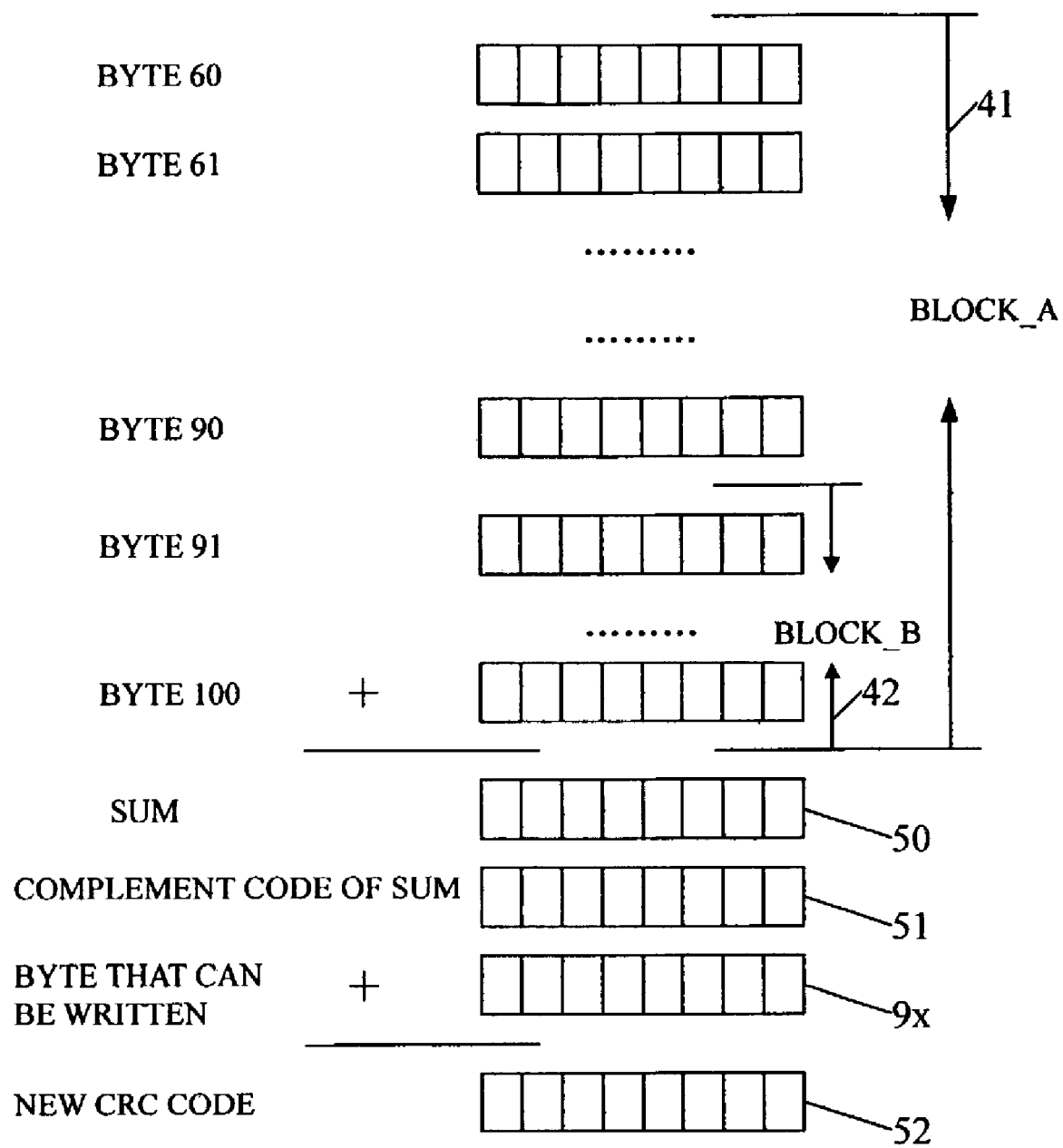
FIG. 3 illustrates a method according to the present invention for generating CRC codes of data in a flash ROM.

FIG. 3 illustrates a method according to the present invention for generating CRC codes of data in a flash ROM. In the flash ROM 40 described above, each data block 41 includes a plurality of bytes. In the example shown in FIG. 3, forty-one bytes are contained in one data block 41, and these bytes are designated as byte 60 through byte 100. The data block 41 contains the CRC code block 42, which contains a plurality of bytes tat are designated as byte 91 through byte 100. The microprocessor 10 adds all bytes of the data block 41 up to a sum 50, calculates a complement code 51 of the sum 50, and find a byte 9×that can be rewritten (as detailed in the following paragraph). The complement code 51 is also known as a complementary code, and relates to binary Boolean calculating. Rewriting means changing a bit from a high level voltage represented by 1 to a low level voltage represented by 0. One byte includes 8 bits, and may for example have a binary numerical value 11110101. This byte can be rewritten as 101000101, since any corresponding bit having a value 1 can be rewritten to the value 0. The byte cannot the example be rewritten as 10011101, since the fifth bit of the byte has a value 0, which cannot be rewritten as the value 1. The sum of the byte 9×that can be rewritten and the complement code 51 is a new CRC code 52.

Figure 4:
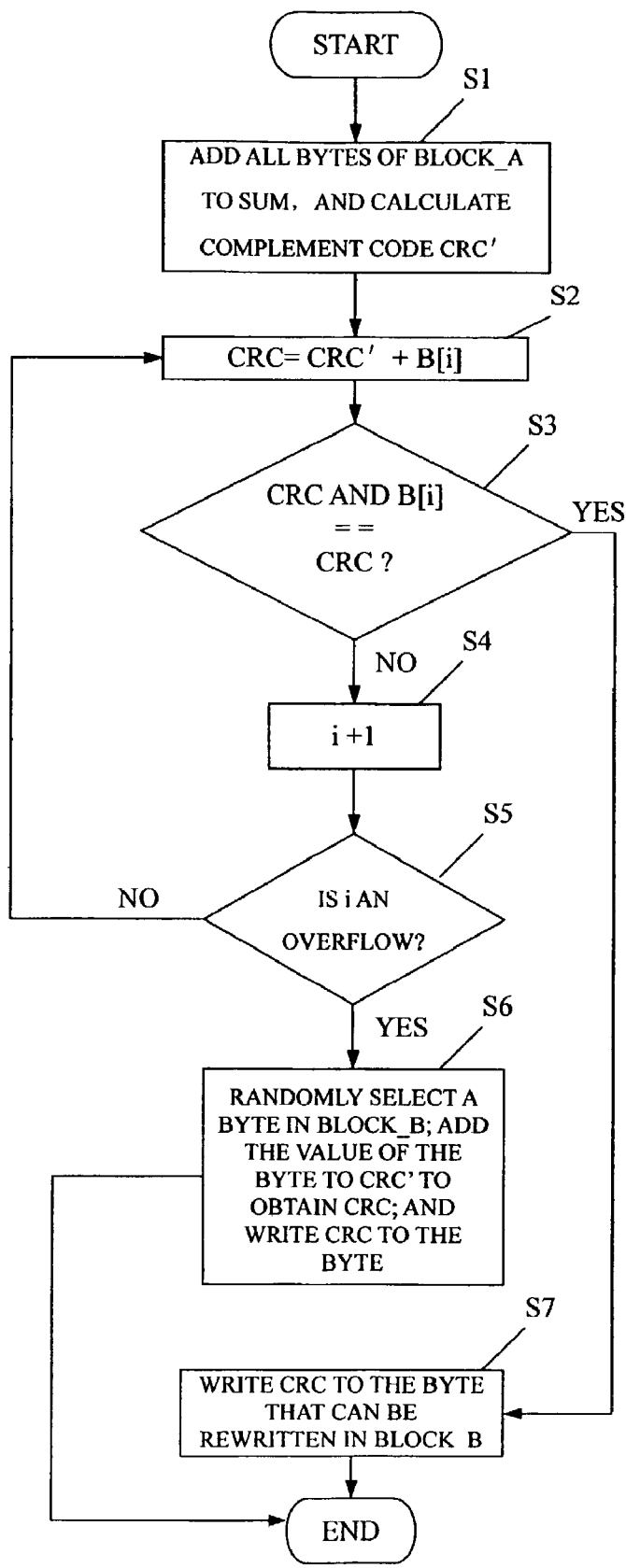
FIG. 4 is a flow chart of a method according to the present invention for allocating CRC codes in a flash ROM.

FIG. 4 is a flow chart of a method according to the present invention for allocating CRC codes in a flash ROM. In FIG. 4, "BLOCK_A" represents a data block such as the data block 41 shown in FIG. 2. "BLOCK_B" represents the CRC code block of a data block, such as the CRC code block 42 shown in FIG. 2. "SUM" represents the sum of all the bytes of a data block. "CRC" represents the complement code of SUM. "CRC" represents the CRC codes of the data of a data block. "i" represents the address of one of the bytes in the CRC code block. "B[i]" represents the data of one of the bytes in BLOCK_B.

The microprocessor 10 writes data to the flash ROM 40 and generates related CRC codes. If any data of BLOCK_A are modified, in step S1, the microprocessor 10 adds all bytes of BLOCK_A up to SUM, and calculates the complement code CRC' of SUM. "i" is initialized as the address of the first byte of BLOCK_B. In step S2, the microprocessor 10 adds CRC' and B[i] up to CRC, and performs an AND-operation on a bit by bit basis between CRC and B[i]. In step S3, the microprocessor 10 determines whether the result of the AND-operation is equal to CRC. If the result of the AND-operation is equal to CRC, this means that B[i] can be rewritten, and the "i" of B[i] represents the byte that can be rewritten. Accordingly, in step S7, the microprocessor 10 writes CRC to the byte, and in this way the CRC codes are generated, whereupon the procedure is ended. If the result of the AND-operation is not equal to CRC, in step S4, the microprocessor 10 adds 1 to "i," so that "i" relates to the address of the next byte in BLOCK_B. In step S5, the microprocessor 10 determines whether "i" is an overflow; that is, whether "i" is larger than the address of the last byte of BLOCK_B. If "i" is an overflow, this means that there is no byte left to be rewritten. Accordingly, in step S6, the microprocessor 10 randomly selects a byte of BLOCK_B and adds it to CRC', and the sum obtained is the new CRC. The microprocessor 10 writes the new CRC to the byte, whereupon the procedure is ended. If "i" is not an overflow, the procedure returns to step S2 to continue searching for bytes that can be rewritten. By this means according to the present invention, the new CRC codes are generated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for allocating Cyclic Redundancy Check (CRC) codes in a flash ROM (Read-Only Memory) via a microprocessor, the method comprising the steps of:
   logically dividing a flash ROM into a plurality of data blocks, each of the plurality data blocks comprising a CRC code block, the CRC code block comprising a plurality of bytes for saving CRC codes;
   reading data from a data block of the flash ROM and calculating a complementary code of a sum of all the bytes of the data block;
   adding a value of each of the plurality of bytes of the CRC code block of the data block to the complementary code and obtaining a first sum, and performing an AND-operation on a bit by bit basis between the first sum and the value of the byte;
   writing the first sum to the byte as a new CRC code if any one of the results of the AND-operation is equal to the first sum; or
   randomly selecting a byte in the CRC code block if none of the results of the AND-operation for the plurality of bytes of the CRC code block is equal to the first sum, adding the value of the byte with the complementary code and obtaining a second sum, erasing the byte, and writing the second sum to the byte as a new CRC code.

2. The method as defined in claim 1, wherein the new CRC code occupies one byte in the CRC code block.

3. An apparatus for allocating Cyclic Redundancy Check (CRC) codes in a flash Read-Only Memory (flash ROM), the apparatus comprising;
   a flash ROM logically divided into a plurality of data blocks, each of the plurality of data blocks comprising a CRC code block, the CRC code block comprising a plurality of bytes for saving CRC codes; and
   a microprocessor used for writing to and reading from the flash ROM, reading data from a data block of the flash ROM and calculating a complementary code of a sum of all the bytes of the data block, adding a value of each of the plurality of bytes of the CRC code block of the data block to the complementary code to obtain a first sum, and performing an AND-operation on a bit by bit basis between the first sum and the value of the byte;
   wherein:
   the microprocessor writes the firs sum to the b e as a new CRC code, if any one of the results of the AND-operation is equal to the first sum; or
   the microprocessor randomly selects a byte in the CRC code block, if none of the results of the AND-operation for the plurality of bytes of the CRC code block is equal to the first sum; and the microprocessor adds the value of the byte with the complementary code and obtains a second sum, erases the byte, and writes the second sum to the byte as a new CRC code.

4. The apparatus as defined in claim 3, wherein the new CRC code occupies one byte in the CRC code block.

* * * * *